(12) United States Patent
Wang et al.

(10) Patent No.: US 6,258,272 B1
(45) Date of Patent: Jul. 10, 2001

(54) INTERNAL HYDROPHILIC MEMBRANES FROM BLENDED ANIONIC COPOLYMERS

(75) Inventors: I-fan Wang, San Diego, CA (US); Richard A. Morris, Longwood, FL (US); Richard McDonogh, San Diego, CA (US)

(73) Assignee: USF Filtrations and Separations Group, Inc., Timonium, MD (US)

( * ) Notice: Subject to any disclaimer, the term of this patent is extended or adjusted under 35 U.S.C. 154(b) by 0 days.

(21) Appl. No.: 09/289,277

(22) Filed: Apr. 9, 1999

(51) Int. Cl.$^7$ ..................................................... B01D 71/68

(52) U.S. Cl. ................................ 210/500.41; 210/500.27; 264/41; 264/48; 264/49

(58) Field of Search ................ 210/500.27, 500.41, 210/638; 264/41, 48, 49; 521/27; 524/592; 528/171

(56) References Cited

U.S. PATENT DOCUMENTS

| | | |
|---|---|---|
| 3,855,122 | 12/1974 | Bourganel . |
| 4,054,707 | 10/1977 | Quentin . |
| 4,268,650 | 5/1981 | Rose . |
| 4,273,903 | 6/1981 | Rose . |
| 4,351,860 | 9/1982 | Yoshida . |
| 4,629,563 | 12/1986 | Wrasidlo . |
| 4,714,725 * | 12/1987 | Hendy et al. .......................... 210/651 |
| 4,774,039 | 9/1988 | Wrasidlo . |
| 4,798,847 | 1/1989 | Roesink et al. . |
| 4,818,387 * | 4/1989 | Ikeda et al. ........................... 210/490 |
| 4,822,489 | 4/1989 | Nohmi et al. . |
| 4,866,099 | 9/1989 | Hendy . |
| 4,920,193 | 4/1990 | Hann et al. . |
| 4,935,139 | 6/1990 | Davidson et al. . |
| 4,939,180 | 7/1990 | Hendy . |
| 4,971,695 | 11/1990 | Kawakami et al. . |
| 4,976,859 * | 12/1990 | Wechs ............................. 210/500.23 |
| 5,009,824 * | 4/1991 | Walch et al. ........................ 264/45.1 |
| 5,071,448 * | 12/1991 | Bikson et al. ........................ 210/654 |
| 5,102,917 | 4/1992 | Bedwell et al. . |
| 5,171,445 | 12/1992 | Zepf . |
| 5,188,734 | 2/1993 | Zepf . |
| 5,246,582 | 9/1993 | Sluma et al. . |
| 5,693,740 | 12/1997 | Colquhoun et al. . |

FOREIGN PATENT DOCUMENTS

| | | |
|---|---|---|
| 61-249504 | 11/1986 | (JP) . |
| 5-4031 | 1/1993 | (JP) . |
| 104656 | 11/1994 | (RO) . |

OTHER PUBLICATIONS

Pozniak, et al.: "Sulfonated Polysulfone Membranes with Antifouling Activity", vol. 233, pp. 23–31.

Knoell, T. et al.: "Biofouling Potentials of Microporous Membranes Containing a Sulfonated Polyetherethersulfone/ Polyethersulfone Block Copolymer", vol. 157, pp. 117–138.

JP 61249504–A; Nov. 6, 1986; (CA # 106:69284; Derwent Abstract #1986–334900).

ZA 8003750; Jun. 24, 1981; (CA#95:205149; Derwent Abstract # 1981–71760D).

(List continued on next page.)

Primary Examiner—Ana Fortuna
(74) Attorney, Agent, or Firm—Knobbe, Martens, Olson, and Bear LLP

(57) ABSTRACT

The present invention relates to hydrophilic membranes containing blends of polysulfone polymers and sulfonated polymers or copolymers, where the sulfonated polymers or copolymers are sulfonated before blending with the polysulfone polymer. The invention also relates to methods of preparing the hydrophilic membranes. In one aspect of the invention, the membranes are formed by casting a mixed polymer solution comprising a sulfone polymer and a copolymer of a sulfonated polymer and a sulfone polymer and quenching the film in an aqueous bath to produce a coagulated membrane. The membranes can be ultrafiltration or microfiltration membranes, symmetric or asymmetric.

32 Claims, 1 Drawing Sheet

OTHER PUBLICATIONS

JP 62049912; Mar. 4, 1987; (CA#107:135528; Derwent Abstract #1987–103990).

JP 5004031; Jan. 14, 1993; (CA# 119:74243; Derwent Abstract #1993–054876).

Derwent Abstract# 1993–262809.

CA#122:11629; Study on Polysulfone–sulfonated polysulfone blend ultrafiltration membrane) Inventors: Xu, et al.

European Search Report; Application No. EP 00 30 3490.

* cited by examiner

INTERNAL HYDROPHILIC MEMBRANES FROM BLENDED ANIONIC COPOLYMERS

BACKGROUND OF THE INVENTION

1. Field of the Invention

The present invention relates to hydrophilic membranes containing blends of polyethersulfone and sulfonated polymers or copolymers. In particular, the invention relates to hydrophilic membranes wherein the sulfonated polymers or copolymers are sulfonated before being blended with the polyethersulfone.

2. Background of the Invention

Filtration membranes are useful for numerous applications where it is desirable to purify or separate components of gaseous or liquid mixtures. Some applications include, for example, reverse osmosis, computer chip manufacturing, medical applications, and beverage processing. Because the applications for membranes are diverse and numerous, so too are the structures of the membranes and the materials from which they are made.

Membranes can be classified in various ways. One classification scheme lists types of membranes functionally in increasing order of their size selectivity: gas separation (GS), reverse osmosis (RO), ultrafiltration (UF), and microfiltration (MF).

Membranes can also be classified by their cross-sectional symmetry or asymmetry. A membrane that is symmetric, or isotropic, has relatively constant pore sizes throughout its thickness, while an asymmetric membrane has variable pore sizes, usually having relatively larger pores on one side of the membrane and relatively smaller pores on the opposite side of the membrane. Advances in membrane technology have led to membranes having high degrees of cross-sectional asymmetry, as discussed below in more detail.

The materials of which membranes can be constructed also have a major effect on the applications for which the membranes may be used. For example, one major use for microfiltration membranes is to remove microorganisms such as bacteria and yeast from aqueous solutions in the areas of food technology, medicine, and pharmaceuticals. In these areas, it is important that the membranes withstand sterilization. Membranes are normally sterilized with steam at temperatures greater than 110° C. Many membranes will not withstand exposure to steam sterilization, because the materials from which they are made are not stable in the presence of steam. For example, membranes made of polyacrylonitrile are irreversibly damaged by exposure to steam. Further, other polymers such as polycarbonates and polyamides are hydrolyzed by steam.

Membranes made of materials such as polyetherimides, polysulfones, or polyvinylidene fluoride can be steam sterilized. Membranes made with these materials are hydrophobic, however, and are not spontaneously wettable with water. Water will not pass through a hydrophobic membrane at pressures lower than the bubble point unless the membrane is primed with a fluid. Further, hydrophobic membranes tend to adsorb high molecular weight components and foul.

Sulfone polymers are especially preferred materials for constructing membranes because of their availability, durability, versatility, and amenability to casting conditions that result in a great variety of membrane porosities and structures. As stated earlier, however, membranes prepared from sulfone polymers are hydrophobic. Therefore, in applications requiring operation of membranes in aqueous environments, hydrophobic sulfone membranes may be reacted with, or mixed with, moieties which cause the resulting membranes to become hydrophilic.

For example, hydrophilic membranes have been made by adding hydrophilic compounds such as polyvinylpyrrolidone (PVP) to the membrane. However, the hydrophilic compounds are often water-soluble, and they can leach out during filtration, thereby not only reducing the hydrophilicity of the membrane but also creating a risk of contaminating the filtrate. One can reduce leaching by crosslinking the wetting agent and intertwining it with the membrane polymer. For example, Roesink et al. in U.S. Pat. No. 4,798,847 (now Re. No. 34,296) disclose crosslinking polyvinylpyrrolidone throughout the structure of the polysulfone membranes. However, while crosslinking hydrophilic moieties to membranes minimizes leaching, it can also reduce hydrophilicity in proportion to the number of crosslinks created. Moreover, it adds an additional step and complexity to the formulation and casting process of a membrane.

Hydrophilic, water insoluble polymers have been used to make membranes. Manufacture of membranes containing sulfonated polymers has been disclosed in, for example, U.S. Pat. No. 3,855,122. However, these membranes retain large amounts of salt and are used primarily for reverse osmosis.

Other membranes containing mixtures of sulfonated and non-sulfonated polysulfone are described in U.S. Pat. No. 5,246,582. The membranes are hollow fibers which are suitable for dialysis. They have small pores and are suitable for ultrafiltration, not microfiltration. The membranes are therefore limited in their application. In particular, microfiltration membranes are required for most applications in the food, medicine, and pharmaceutical industries.

Further, the only sulfonated polysulfone which was used in the '582 patent was sulfonated polyethersulfone. Expanding the range of sulfonated raw materials to be blended into the membranes could lead to a broader range of properties. Finally, those membranes are isotropic, as evidenced by the micrographs in the '582 patent. Asymmetric membranes have advantages over isotropic membranes, such as higher capacity.

Hydrophilic membranes containing sulfonated polymers have also been made by sulfonating polysulfone membranes. See, for example, U.S. Pat. No. 4,866,099. Sulfonating already prepared membranes generates defects, and the resulting membranes have low flow rates, inconsistent wettability, wrinkles, and low solute retention.

Composite membranes containing polysulfone and sulfonated polymers have been disclosed in, for example, U.S. Pat. No. 5,693,740. The composite membranes comprise a thin film of the polymer supported on an ultrafiltration membrane. Forming composite membranes requires two process steps, forming the support membrane and adding the film. Composite membranes are therefore more expensive and require more complicated manufacture than membranes that can be formed in a single step.

Another challenge in the manufacture of membranes is the creation of a membrane with pores that are small enough to retain macromolecules, while maintaining an acceptable flow rate of the fluid to be filtered. A membrane's resistance to fluid flow is a function of the diameter of the smallest, or retentive, pores through which the fluid must pass, and is also a function of the thickness of the layer of retentive pores.

Some filtration membranes have a layer of very small pores (termed herein a "skin") on one side, while other membranes do not contain this type of layer (termed herein "skinless"). The asymmetry of the pores within the membrane can vary, depending on the conditions under which the membrane is produced. For example, a perfectly symmetrical membrane would have pores of the same diameter on both faces and throughout the support structure between the two faces. However, a highly asymmetric membrane may have pores that change in diameter by 10:1, 100:1, 1,000:1, 10,000:1 or more from one face to the other. Asymmetric membranes are useful in many applications. For example, such membranes can be used for a variety of filtration applications for purification and testing in the food and beverage industry, water treatment, pharmaceuticals, and in medical laboratories.

There are advantages to both symmetric and asymmetric membranes. In general, however, asymmetric membranes are preferred, because the wide pores act as a prefilter to retain particles that are much larger than the skin pores before they come into contact with the skin layer. The prefiltering effect reduces plugging and prolongs the lifetime of the membrane.

Asymmetric membranes are well known in the art. For example, Wrasidlo in U.S. Pat. Nos. 4,629,563 and 4,774,039 and Zepf in U.S. Pat. Nos. 5,188,734 and 5,171,445, the disclosure of which are hereby incorporated by reference, disclose asymmetric membranes and method for their production. Each of the Wrasidlo and Zepf patents disclose integral, highly asymmetric, microporously skinned membranes, having high flow rates and excellent retention properties. The membranes are generally prepared through a modified "phase inversion" process using a metastable two-phase liquid dispersion of polymer in solvent/nonsolvent systems which is cast and subsequently quenched in a nonsolvent. The Zepf patent discloses an improvement on the Wrasidlo patent.

The phase inversion process generally proceeds through the steps of casting a solution or a mixture comprising a polymer, a solvent, and a nonsolvent into a film, tube or fiber and precipitating the polymer. The most common method of precipitating the polymer is quenching in a nonsolvent liquid, generally water.

The nonsolvent and its concentration in the casting mix produce a region of instability which causes rapid precipitation when quenched in the nonsolvent liquid. This rapid precipitation may form a microporous skin at the interface and consequently can result in a highly asymmetric membrane.

In the past, when membranes were cast from chemically modified sulfone polymers, such as sulfonated sulfones, much of the potential for controlled variation in membrane structure, such as high cross sectional asymmetry of the membrane, was lost. It has been difficult to cast a highly asymmetric membrane from a hydrophilic polymer by conventional methods.

There is therefore a need for a method for preparing hydrophilic membranes which have pores large enough for microfiltration rather than ultrafiltration. Further, there is a need for a method of preparing hydrophilic membranes containing a range of sulfonated polymers with consistent properties. There is also a need for a method of preparing such membranes in which the hydrophilic components are nonleachable in water so that the membranes do not become hydrophobic when the hydrophilic components are leached out by water. In addition, there is a need for a method of casting membranes from casting solutions containing polysulfones and polyethersulfones together with sulfonated polymers to produce asymmetric membranes with longer lifetimes than symmetric membranes. Finally, there is a need for a method of producing hydrophilic membranes having a wide range of pore distributions.

SUMMARY OF THE INVENTION

The present invention provides, in one aspect, an integral internally hydrophilic membrane cast from a solution or suspension. The solution or suspension may include a sulfone polymer, a sulfonated copolymer, a nonsolvent, and a solvent. The membrane has a first surface and a second surface, each surface having pores thereon, and a porous supporting structure between the first and second surface, wherein the porous supporting structure includes a reticulated network of flow channels between the pores of the first surface and the second surface. The sulfone polymer may be, for example, polysulfone, polyethersulfone, or polyarylsulfone. The sulfonated copolymer may include units of polysulfone, polyethersulfone, or polyarylsulfone, and the sulfonated copolymer may be, for example:

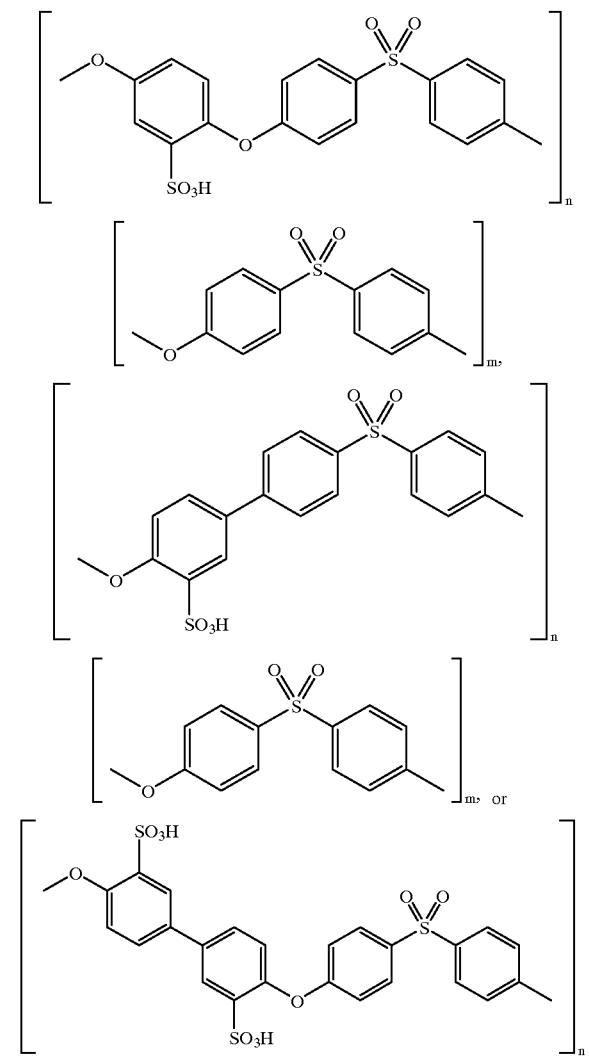

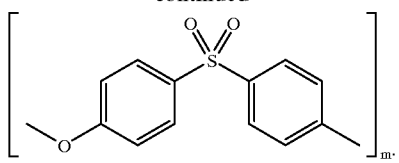

The ratio of m to n in the subunits of the copolymer may be between about 4 and 99. The nonsolvent of the membrane of this aspect of the invention may be, for example, alcohols, such as t-amyl alcohol or 1-butanol, ethers, surfactants, or water. The solvent may be N-methylpyrrolidone.

The membrane of the invention may be an ultrafiltration membrane, and may have a molecular weight exclusion cutoff of about 10 kDa, or about 100 kDa. Likewise, the membrane may be a microfilter, and may have a mean flow pore size of less than about 0.1 micron, about 0.2 micron, or about 0.3 to about 1.0 micron. The membrane may be asymmetric, and the pores of the first surface may be at least about 5 times smaller than the pores at the second surface. The flow channels of the porous supporting structure may gradually increase in diameter from first surface to the second surface.

In another aspect, the invention provides a method of forming an integral internally hydrophilic membrane. The method may include: providing a casting solution or suspension including a sulfone polymer, a sulfonated copolymer, a solvent, and a nonsolvent; casting the solution or suspension to form a thin film; coagulating the film in a quench bath; and recovering an integral internally hydrophilic membrane having a first surface and a second surface, each surface having pores thereon, the membrane also having a porous supporting structure between the first and second surface, wherein the porous supporting structure includes a reticulated network of flow channels between the pores of the first surface and the second surface.

In the method of this aspect of the invention the sulfone polymer may be, for example, polysulfone, polyethersulfone, and polyarylsulfone, and the sulfonated copolymer may include units of polysulfone, polyethersulfone, or polyarylsulfone, such as, for example:

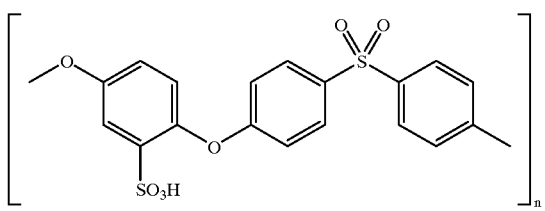

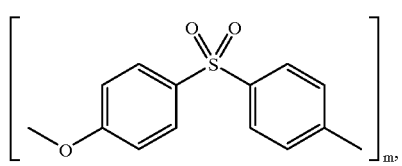

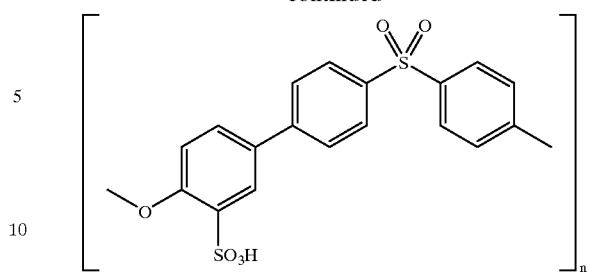

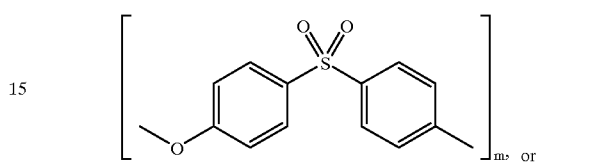

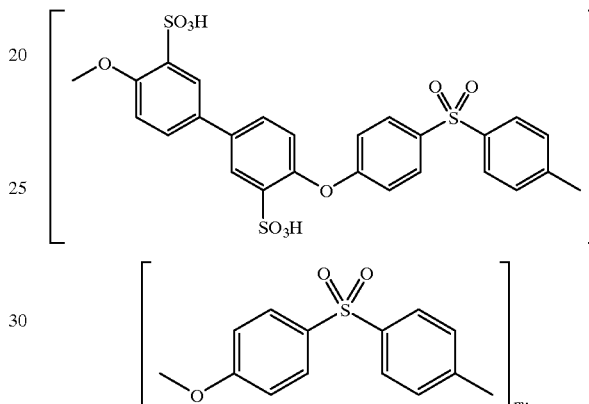

In this aspect of the invention, the ratio of m to n in the subunits of the copolymer may be between about 4 and 99. The nonsolvent may be, for example, alcohols such as t-amyl alcohol or 1-butanol, ethers, surfactants, and water. The solvent may be N-methylpyrrolidone.

The method may produce an ultrafiltration membrane, such as one having, for example, a molecular weight exclusion cutoff of about 10 kDa, or one having a molecular weight exclusion cutoff of about 100 kDa. Likewise, the method may produce a microfilter, which may have a mean flow pore size of less than about 0.1 micron, or about 0.2 micron, or about 0.3 to about 1.0 micron. The membranes produced by the method of the invention may be isotropic or asymmetric, and the pores of the first surface may be at least about 5 times smaller than the pores at the second surface. In such a membrane, the flow channels of the porous supporting structure may gradually increase in diameter from first surface to the second surface.

DETAILED DESCRIPTION OF THE PREFERRED EMBODIMENT

Figure 1:
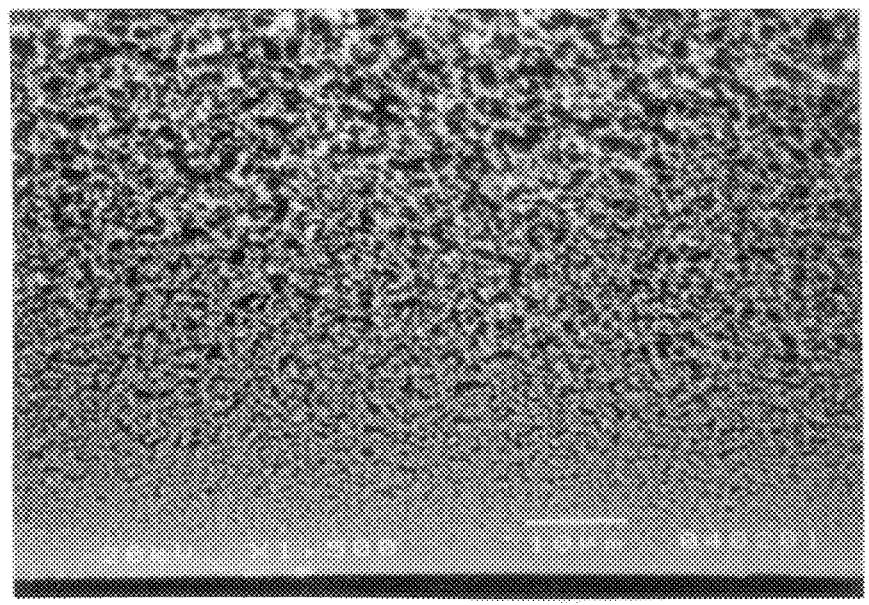
FIG. 1 is a scanning electron micrograph taken at a magnification of 1500× of the cross section of a membrane produced by the method described in Example 2.

The present invention relates to hydrophilic membranes that have high flow rates, are non-leachable, have consistent properties, and can contain a range of sulfonated polymers.

Further, the membranes can be made with a range of structures, depending on the method of preparation. For example, the membranes can be prepared to be either isotropic or asymmetric. Further, both the symmetric and the asymmetric membranes can be prepared to have a wide range of pore sizes and distributions. For example, the membranes can be prepared to be microfiltration membranes or ultrafiltration membranes.

Ultrafiltration membranes are typically categorized in terms of molecular weight exclusion cutoff values, which may be determined based on the efficiency of retention by the membrane of substances having a known molecular weight, such as, for example, polysaccharides or proteins. The ultrafilters of the invention may have molecular weight cutoff values of, for example, about 10 kDa or less, 30 kDa, 50 kDa, 100 kDa, or higher.

Microfiltration membranes may be categorized based on the size of the limiting pores of the membranes. Depending on the structure of the membranes, the limiting pores may be at one surface thereof, in which case they may be referred to as "skin" pores. Alternatively, the limiting pores may be within the membrane, either just beneath one surface or deeper in the internal membrane structure. When the limiting pores are not at the surface, it is difficult to visually measure their size using microscopy. In such cases, mean flow pore size may be determined by porometric tests as described herein. Accordingly, microfiltration membranes of the invention may have limiting pores or mean flow pore sizes of, for example, about 0.03 micron or less, 0.1 micron, 0.2 micron, 0.5 micron, 1.0 micron, 2.0 micron, and larger.

Asymmetric membranes are characterized by changes in the size of pores of flow channels as measured from one surface or internal position in the membrane to another surface of the membrane or another internal position therein. A relatively straightforward way of quantifying asymmetry is in terms of the ratio of average pore diameters on the two surfaces. For example, asymmetric membranes of the invention may have pore size ratios of 2, 5, 10, 50, 100, 500, 1000 or more. Asymmetry may be gradual or abrupt within the thickness of the membrane. For example, it is possible to have two membranes that both have an asymmetry ratio of 10, but with very different internal structures, depending on whether there is a steady gradient of increasing pore sizes, or different regions within the membrane having different gradients of pore size change, such that pore size would change in a steep gradient over a portion of the thickness of the membrane, and much more gradually in another portion of the thickness thereof.

The membranes preferably comprise a sulfone polymer and one or more sulfonated polymers or copolymers. The sulfone polymer and the sulfonated polymer or copolymer are blended after the polymer or copolymer is sulfonated, thereby avoiding degradation of an already formed membrane through sulfonation.

Preferred sulfone polymers are polysulfone, polyarylsulfone, and polyethersulfone. Polyethersulfone (PES) is the most preferred sulfone polymer.

In one embodiment of the invention, the sulfonated copolymer comprises the copolymer:

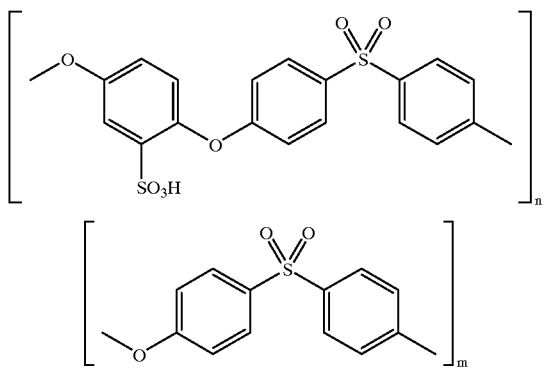

The copolymer shown above is commercially available from U.S. Filter/Acumem under the tradename SPEES/PES™.

In another embodiment, the sulfonated copolymer comprises the copolymer:

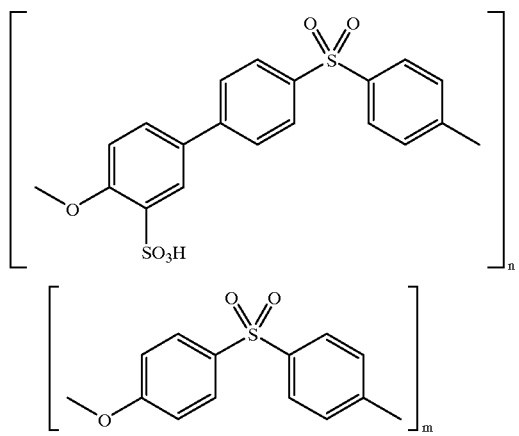

The copolymer shown above is commercially available from U.S. Filter/Acumem under the tradename POLYMER 388™.

In another embodiment, the sulfonated copolymer comprises the copolymer:

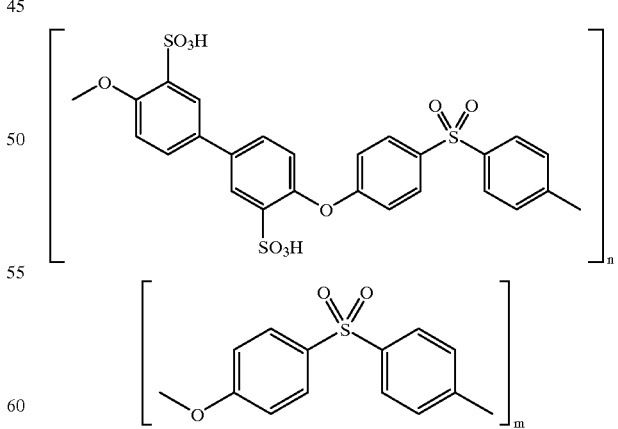

The copolymer shown above is commercially available from U.S. Filter/Acumem under the tradename SPEDES/PES™.

For the foregoing copolymers, the m/n ratio of the two kinds of subunits may range from about 4 to 99, wherein, for example, n=1, m=99 to n=20, m=80.

In one embodiment of the present invention, membranes are prepared by providing a casting solution comprising between from about 8 and 20% by weight of a sulfone polymer, between about 0.1 and 6% by weight of a sulfonated polymer or copolymer, between about 44 and 81.9% of a solvent, and between about 10 and 30% by weight of a nonsolvent or pore former. Polyethersulfone is the preferred sulfone polymer. If the sulfonated polymer or copolymer is a copolymer of a sulfonated polymer and PES, the weight percent is the weight percent of the complete copolymer, not the weight percent of the sulfonated polymer alone.

The sulfonated polymer or copolymer is a different material from the sulfone polymer referenced alone. It is sulfonated before preparing the casting solution or before forming the membrane. The weight % of the sulfonated copolymer in the casting solution is preferably between about 0.1 and 6 wt %, more preferably between about 0.2 and 3 wt %, and most preferably between about 0.4 and 2 wt %.

The solvent is preferably N-methylpyrrolidone (NMP) or dimethylformamide (DMF). Other suitable solvents include, but are not limited to, dimethylacetamide, dioxane, dimethylsulfoxide, chloroform, and tetrachloroethane propionic acid and tetrahydrofuran.

Suitable examples of nonsolvents or pore formers include, but are not limited to, 2-methoxyethanol, t-amyl alcohol, 1-butanol, methanol, ethanol, isopropanol, hexanol, heptanol, octanol, acetone, methylethylketone, methylisobutylketone, butyl ether, ethyl acetate, amyl acetate, glycerol, diethyleneglycol, di(ethyleneglycol) diethylether, di(ethyleneglycol)dibutylether, surfactants such as TWEEN 20, 40, 60, 80, and water.

The casting solution is preferably a stable clear homogeneous solution or stable colloidal dispersion. The casting solution is then cast to form a thin film and may be exposed to a gaseous environment, such as air, for between about 0 and 30 seconds. The relative humidity of the gaseous environment may range from about 20 to 100%, preferably from about 30 to 90%, more preferably from about 40 to 75%, and most preferably from about 50 to 60%. The thin film is then coagulated into a stable membrane by introducing the thin film into a quench bath having a temperature between about 1° C. and 60° C., preferably between about 10° C. and 50° C., more preferably between about 20° C. and 40° C., and most preferably between about 22° C. and 30° C. Water is the generally preferred quench liquid for economic and environmental reasons.

In other embodiments of the invention, membranes can be formed from blends of polysulfones and sulfonated polymers or copolymers of the inventions as a melt-blown membrane. Membranes can be formed as flat sheet membranes or hollow fiber membranes, and can be packaged into filter cartridges.

EXAMPLES

The following examples are provided to illustrate the present invention. However, such examples are merely illustrative and are not intended to limit the scope of the claims.

Example 1
Preparation of Internally Hydrophilic Cast Membranes with SPEES/PES™, PES, and t-Amyl Alcohol A casting solution was prepared containing, by weight, 4% SPEES/PESTM, 14% polyethersulfone (EP-6020P, manufactured by BASF, Bridgeport, N.J.), 18.6% t-amyl alcohol as the non-solvent, and 63.4% dimethylformamide (DMF) as the solvent. Membrane samples were cast onto a moving belt of polyethylene coated paper using a casting knife with a knife gap of 17 mils (425 $\mu$m). Following casting, the membranes were quenched in a water bath at about 20° C. After coagulation, the membranes were washed with deionized water and then air dried or dried with an additive such as glycerol to prevent the pores from collapsing.

The membranes thus formed were internally hydrophilic. Each of the membranes was tested for water permeability and retention of the protein immunoglobulin G (IgG ~160 kDa) at 10 psi (about 68.7 kPa) on a 25 mm diameter disk (approximately 3.8 cm$^2$ effective filtering area). The test results are shown in Table 1.

Example 2
Preparation of Internally Hydrophilic Cast Membranes with POLYMER 388™, PES, and t-Amyl Alcohol A process similar to that described in Example 1 was used in the present Example with a casting solution containing 2% POLYMER 388 ™, 16% polyethersulfone, 18% t-amyl alcohol, and 64% DMF. Membrane samples were cast, quenched, and dried as described in Example 1.

The membranes thus formed were internally hydrophilic. The test results for water permeability, IgG retention, and wettability are shown in Table 1. SEM showed that the membrane had an asymmetric cross-sectional structure, as shown in FIG. 1.

Example 3
Preparation of Internally Hydrophilic Cast Membranes with SPEDES,/PES™ PES, and t-Amyl Alcohol A process similar to that described in Example 2 was used in the present Example with a casting solution containing 1.5% SPEDES/PES™, 15% polyethersulfone, 18.5% t-amyl alcohol, and 66% DMF. Membrane samples were cast, quenched, and dried as described in Example 1.

Figure 2:
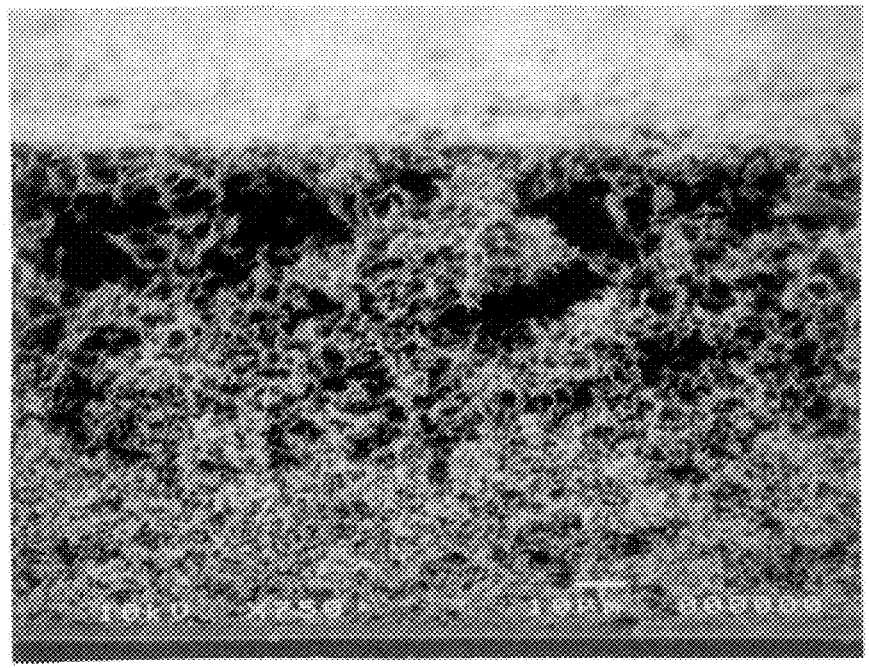
FIG. 2 is a scanning electron micrograph taken at a magnification of 750× of the cross section of a membrane produced by the method described in Example 3.

The membranes thus formed were internally hydrophilic. Each of the membranes was tested for water permeability and IgG retention as in Example 1. The test results are shown in Table 1. An SEM of the cross section of the membrane is shown in FIG. 2, and demonstrates that the membrane had an asymmetric cross-sectional structure. The membrane of Example 3 was more asymmetric than the membrane of Example 2.

The membrane was tested for dye retention at 55 psi (about 378 kPa) on a 25-mm diameter disk stirred cell. Using a 10 ppm solution of methylene blue cationic dye, the membrane retained more than 99.9% of the dye from more than 100 ml of solution. Efficiency of cationic dye is a measure of the presence of negatively charged moieties in the membrane.

The results of the water flow and retention experiments for the membranes of Examples 1–3 are shown in Table 1. The water flow test in the table was for a 25 mm disk at 10 psi (68.7 kPa).

TABLE 1

Water Flow and Retention of Membranes Containing PES and Sulfonated Polymers

| Example No. | Water Flow (ml/min) | % IgG Retention | Wettability |
| --- | --- | --- | --- |
| 1 | 5.2 | 95.3 | Instant Wetting |
| 2 | 5.6 | 98 | Instant Wetting |
| 3 | 10 | 90 | Instant Wetting |

As will be observed, all three membranes had high water flow and good retention of the IgG protein. The membrane of Example 3, containing SPEDES/PES™, had the highest water flow but retained less of the IgG protein than the membranes from the other two Examples.

The following Example describes the preparation of an ultrafiltration membrane with smaller pores than those in Examples 1–3. The casting solution was similar to that of Example 2 but contained a lower level of solids. This Example demonstrates that, although generally lowering the level of solids in the casting solution tends to lead to a membrane with larger pores (see Examples 5–7), there are other factors which determine the pore size of the membrane, such as, for example, ratio of solvent to nonsolvent, time of air gap exposure, relative humidity within the air gap, and temperature of casting or quenching. Thus, the pores of the membrane of Example 4 are smaller than those of those of Example 2, even though the casting solution of Example 4 had lower solids content.

Because of the smaller pores in the membrane of Example 4, bovine serum albumin (BSA ~67 kDa), which is a smaller globular protein than IgG, was used to measure protein exclusion.

Example 4
Preparation of a Hydrophilic Ultrafiltration Membrane with POLYMER 388™, PES, and Amyl Alcohol A process similar to that described in Example 2 was used in the present Example with a casting solution containing 1.5% POLYMER 388™, 15% polyethersulfone, 18.5% t-amyl alcohol, and 66% DMF. Membrane samples were cast and quenched as described in Example 1, then air dried.

The membranes thus formed were internally hydrophilic. The membranes were tested for water permeability and BSA retention at 10 psi (68.7 kPa) on a 25 mm diameter disk. The test results are shown in Table 2. The resulting membrane had an asymmetric cross-sectional structure similar to the cross section of the membrane of Example 3. The cross section was more highly asymmetric than for the membrane of Example 2.

The membrane excluded 95.8% of the BSA, a smaller protein than the IgG used in the tests of Examples 1–3. Although the water flow rate of 3.5 ml/min was lower than the flow rates of 5.2 to 10 ml/min obtained with the membranes of Examples 1–3, the flow rate is still high as compared to other ultrafilters. The lower flow rate for the membrane of Example 4 is not unexpected, because the membrane has smaller pores than the membranes of Examples 1–3.

The membranes were tested for cationic dye retention at 55 psi (378 kPa) on a 25-mm diameter disk stirred cell. The membrane retained more than 99.9% dye from 100 ml of a 10 ppm solution of methylene blue.

TABLE 2

Water Flow and BSA Retention for Membrane of Example 4
Prepared from POLYMER 388 ™, PES, and t-Amyl Alcohol

| Example No. | Water Flow (ml/min) | % BSA Retention | Wettability |
| --- | --- | --- | --- |
| 4 | 3.5 | 95.8 | Instant Wetting |

Later examples will compare the hydrophilic ultrafiltration membranes of Examples 1–4 with membranes prepared without sulfonated polymers to show the benefits of forming membranes from blends of PES and sulfonated polymers rather than from PES alone.

In Examples 5, 6, and 7, the solids levels in the casting solutions were reduced from the levels in Examples 1–4. Reducing the solids levels in the casting solutions in the following examples produced membranes with larger pores than those in the membranes of Examples 1–4. The membranes of the following Examples 5, 6, and 7 were microfiltration membranes rather than the ultrafiltration membranes of Examples 1–4. Examples 5, 6, and 7 therefore demonstrate that the method of the invention can produce microfiltration membranes as well as ultrafiltration membranes.

Example 5
Preparation of Microfiltration Membrane with SPEES/PES™, PES, and t-Amyl Alcohol A process similar to that described in Example 1 was used in the present Example with a casting solution containing 1% polymer SPEES/PES™, 10% polyethersulfone, 19% t-amyl alcohol, and 70% DMF. Membrane samples were cast, quenched, and dried as described in Example 4.

The membranes thus formed were internally hydrophilic, microfiltration membranes with larger pores than the ultrafiltration membrane of Examples 1–4. As a result, the protein size exclusion measurements used in the first four Examples were not suitable for measuring the pore size properties of the produced membrane. The membrane was therefore tested for mean flow pore (MFP) size with a Coulter Porometer using a 25 mm disk. The test results are shown in Table 3. The membrane had an asymmetric cross-sectional structure.

The following Example demonstrates the casting of a membrane in a water bath at higher temperature than for Examples 1–5. Quenching the casting solution in a water bath at higher temperature produced a membrane with larger pores than the membranes which were quenched at lower temperature.

Example 6
Preparation of a Microfiltration Membrane Containing SPEES/PES™, PES, and t-Amyl Alcohol Quenched at Higher Temperature A process similar to that described in Example 5 was used in the present Example with a casting solution containing 0.6% polymer SPEES/PES™, 10% polyethersulfone, 20% t-amyl alcohol, 69.4% DMF. Membrane samples were cast, quenched, and dried as described in Example 4, except that, following casting, the membranes were quenched in a water bath at about 43° C., rather than 20° C.

The membranes thus formed were internally hydrophilic. Each of the membranes was tested for MFP by Coulter Porometer. The test results are shown in Table 3. The resulting membranes had asymmetric cross-sectional structure.

The mean flow pore size was 0.2 $\mu$m, larger than the 0.08 $\mu$m pore size for the membrane of Example 5 and far larger than the membranes of the prior examples. Raising the quench temperature to 43° C. in this Example therefore led to a membrane having larger pores than the membranes quenched at 20° C.

The following Example demonstrates the use of 1-butanol in the casting solution in place of the tertiary amyl alcohol. It shows that other pore forming materials or nonsolvents can be used in place of the t-amyl alcohol of the previous examples.

Example 7
Preparation of a Microfiltration Membrane from a Casting Solution of SPEES/PES™, PES, 1-Butanol, and DMF A process similar to that described in Example 2 was used in the present Example with a casting solution containing 0.6% polymer SPEES/PES™, 10% polyethersulfone, 20.2% 1-butanol, and 69.2% DMF. Membrane samples were cast, quenched, and dried as described in Example 4.

The membranes thus formed were internally hydrophilic. Each of the membranes was tested for MFP by Coulter Porometer. The test results are shown in Table 3. The resulting membranes showed an asymmetric cross-sectional structure. Water flow was tested using a 47 mm disk of filter material with and effective filtering area of 9.2 cm$^2$ at 10 psi (68.7 kPa). Water flow rates can be increased significantly (at least 50%) by oven drying the membranes.

Example 7 therefore demonstrates that 1-butanol can be used as pore former in addition to the t-amyl alcohol pore former of the prior examples.

TABLE 3

Water Flow and MFP Size of Microfiltration Membranes Containing PES and Sulfonated Polymers

| Example No. | Water Flow (ml/min) | MFP Size (μm) | Wettability |
|---|---|---|---|
| 5 | 200 | 0.08 | Instant Wetting |
| 6 | 350 | 0.2 | Instant Wetting |
| 7 | 400 | 0.29 | Instant Wetting |

The data in Table 3 for the membranes of Examples 5–7 show that the method of the present invention can produce microfiltration membranes with good water flow and pore size, in addition to the ultrafiltration membranes of Examples 1–4.

The following Example demonstrates that omitting the sulfonated polymer from the casting solution of Example 2 produces a hydrophobic membrane rather than the hydrophilic membrane of Example 2.

Comparative Example A

Preparation of a Membrane from a Casting Solution of PES, t-Amyl Alcohol, and DMF A casting solution similar to that of Example 2 was prepared except that no POLYMER 388™ was included in the solution. The casting solution contained 18% polyethersulfone, 18% t-amyl alcohol, and 64% DMF. Membrane samples were cast, quenched, and dried as described in Example 1.

The membranes thus formed were hydrophobic rather than hydrophilic. Each of the membranes was tested for water permeability and protein (IgG and BSA) retention at 10 psi (68.7 kPa) on a 25-mm diameter disk. The IgG retention was less than 50%, compared with 98% for the membrane of Example 2. The BSA retention was less than 5%. The water flow rates were similar to those for the membrane in Example 2.

Comparative Example A shows that forming membranes from casting solutions without the sulfonated polymer produces a hydrophobic membrane rather than a hydrophilic membrane. Further, the 50% IgG retention of the membrane of Comparative Example A with no sulfonated polymer was far lower than the 98% IgG retention for the membrane of Example 2, which contained the sulfonated POLYMER 388™. Adding the sulfonated POLYMER 388™ to the casting solution therefore formed a more selective membrane as well as forming a hydrophilic membrane.

The following Example describes the casting of a membrane from a solution similar to that of Example 4 but with no sulfonated polymer. The membrane of Example 4 had smaller pores than the membrane of Example 2. The Example below therefore demonstrates that the benefit of adding sulfonated polymer to the casting solution is also advantageous for membranes with smaller pores.

Comparative Example B

Preparation of a Membrane from a Casting Solution of PES t-Amyl Alcohol, and DMF A casting solution similar to Example 4 was prepared with the exception that the solution contained no sulfonated POLYMER 388™. The casting solution contained 16.5% polyethersulfone, 18.5% t-amyl alcohol, and 66% DMF. Membrane samples were cast, quenched, and dried as described in Example 1.

The membranes thus formed were hydrophobic. By contrast, the membranes of Example 4, which were formed with a similar casting solution but with the sulfonated POLYMER 388™, were hydrophilic. Each of the membranes was tested for water permeability and BSA retention at 10 psi (68.7 kPa) on a 25-mm diameter disk. The BSA retention was less than 5%, versus the 95.8% of Example 4.

Omitting the sulfonated polymer, POLYMER 388™, from the casting solution in Comparative Example B therefore produced a hydrophobic membrane rather than a hydrophilic membrane, as in Example 4. Further, the hydrophobic membrane of Comparative Example B retained less than 5% BSA versus 95.8% BSA for the membrane of Example 4. Including the sulfonated polymer in the casting solution therefore formed a hydrophilic membrane rather than a hydrophobic membrane and also greatly improved the protein retention.

EQUIVALENTS

The present invention has been described in connection with specific embodiments thereof. It will be understood that it is capable of further modification, and this application is intended to cover any variations, uses, or adaptations of the invention following, in general, the principles of the invention and including such departures from the present disclosure as come within known or customary practiced in the art to which the invention pertains and as may be applied to the essential features hereinbefore set forth, and as fall within the scope of the invention and any equivalents thereof.

What is claimed is:

1. An integral internally hydrophilic membrane cast from a solution or suspension comprising a non-sulfonated sulfone polymer, a sulfonated copolymer, a nonsolvent, and a solvent, the membrane having a first surface and a second surface, each surface having pores thereon, the membrane also having a porous supporting structure between the first and second surface, wherein the porous supporting structure comprises a reticulated network of flow channels between the pores of the first surface and the second surface, wherein the sulfonated copolymer is selected from the group consisting of:

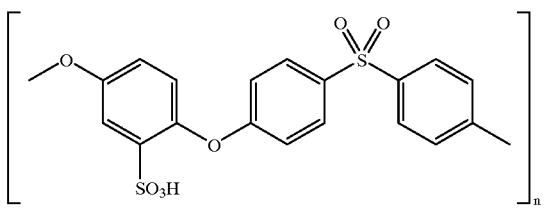

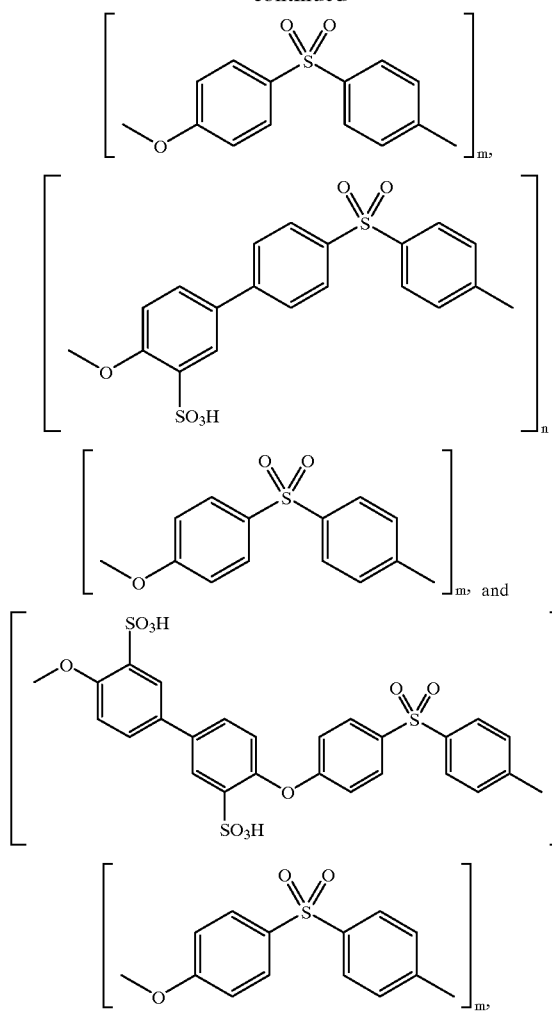

and wherein the ratio of m to n in the subunits of the copolymer is between about 4 and 99.

2. The membrane of claim 1, wherein the non-sulfonated sulfone polymer is selected from the group consisting of polysulfone, polyethersulfone, and polyarylsulfone.

3. The membrane of claim 1 wherein the sulfone polymer is polyethersulfone.

4. The membrane of claim 1, wherein the nonsolvent is selected from the group consisting of alcohols, ethers, surfactants, and water.

5. The membrane of claim 1, wherein the nonsolvent is t-amyl alcohol or 1-butanol.

6. The membrane of claim 1, wherein the solvent is N-methylpyrrolidone.

7. The membrane of claim 1, wherein the membrane is an ultrafiltration membrane.

8. The membrane of claim 7, having a molecular weight exclusion cutoff of about 10 kDa.

9. The membrane of claim 7, having a molecular weight exclusion cutoff of about 100 kDa.

10. The membrane of claim 1, wherein the membrane is a microfilter.

11. The membrane of claim 10, having a mean flow pore size of less than about 0.1 micron.

12. The membrane of claim 10, having a mean flow pore size of about 0.2 micron.

13. The membrane of claim 10, having a mean flow pore size of about 0.3 to about 1.0 micron.

14. The membrane of claim 1, wherein the membrane is asymmetric.

15. The membrane of claim 14, wherein the pores of the first surface are at least about 5 times smaller than the pores at the second surface.

16. The membrane of claim 14, wherein the flow channels of the porous supporting structure gradually increase in diameter from first surface to the second surface.

17. A method of forming an integral internally hydrophilic membrane, the method comprising:
providing a casting solution or suspension comprising a non-sulfonated sulfone polymer, a sulfonated copolymer, a solvent, and a nonsolvent, wherein the sulfonated copolymer is selected from the group consisting of:

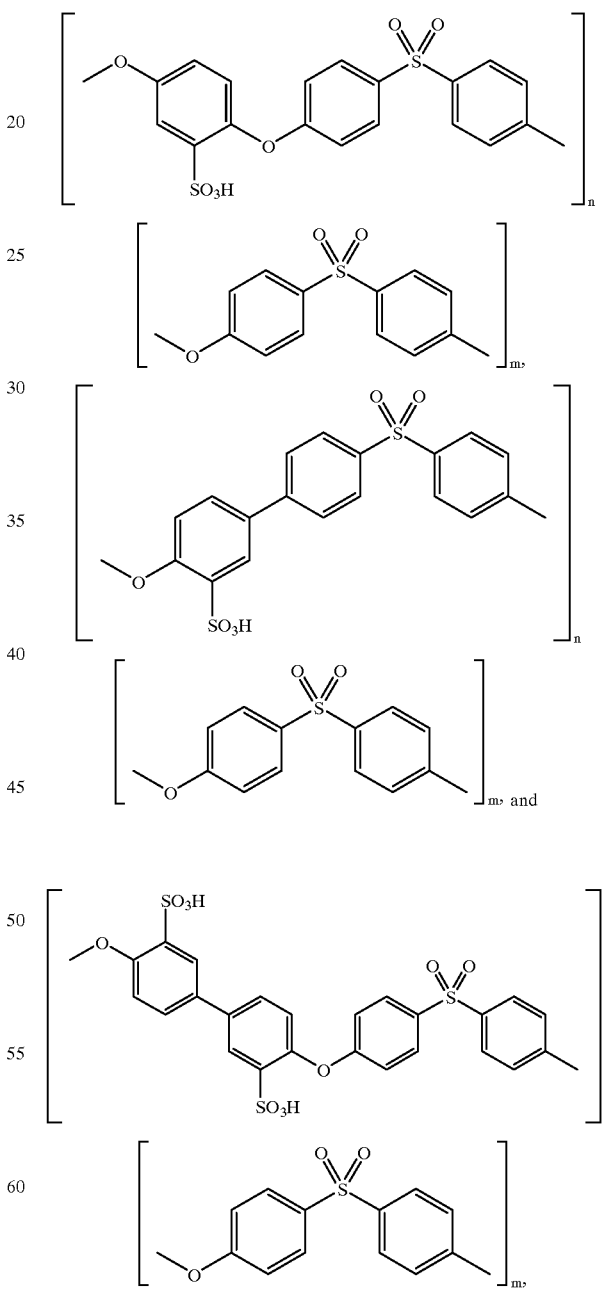

and wherein the ratio of m to n in the subunits of the copolymer is between about 4 and 99;

casting the solution or suspension to form a thin film;

coagulating the film in a quench bath; and recovering an integral internally hydrophilic membrane having a first surface and a second surface, each surface having pores thereon, the membrane also having a porous support structure between the first and second surface, wherein the porous supporting structure comprises a reticulated network of flow channels between the pores of the first surface and the second surface.

18. The method of claim 17, wherein the non-sulfonated sulfone polymer is selected from the group consisting of polysulfone, polyethersulfone, and polyarylsulfone.

19. The method of claim 17, wherein the non-sulfonated sulfone polymer is polyethersulfone.

20. The method of claim 17, wherein the nonsolvent is selected from the group consisting of alcohols, ethers, surfactants, and water.

21. The method of claim 17, wherein the nonsolvent is t-amyl alcohol or 1-butanol.

22. The method of claim 17, wherein the solvent is N-methylpyrrolidone.

23. The method of claim 17, wherein the membrane is an ultrafiltration membrane.

24. The method of claim 23, wherein the membrane has a molecular weight exclusion cutoff of about 10 kDa.

25. The method of claim 23, wherein the membrane has a molecular weight exclusion cutoff of about 100 kDa.

26. The method of claim 17, wherein the membrane is a microfilter.

27. The method of claim 26, wherein the membrane has a mean flow pore size of less than about 0.1 micron.

28. The method of claim 26, wherein the membrane has a mean flow pore size of about 0.2 micron.

29. The method of claim 26, wherein the membrane has a mean flow pore size of about 0.3 to about 1.0 micron.

30. The method of claim 17, wherein the membrane is asymmetric.

31. The method of claim 30, wherein the pores of the first surface are at least about 5 times smaller than the pores at the second surface.

32. The method of claim 30, wherein the flow channels of the porous supporting structure gradually increase in diameter from first surface to the second surface.

* * * * *